US008885557B2

(12) United States Patent
Walke et al.

(10) Patent No.: US 8,885,557 B2
(45) Date of Patent: Nov. 11, 2014

(54) DYNAMIC SELECTION AMONG ALGORITHMS FOR GENERATING FILLERS FOR SECURITY OF DATA COMMUNICATIONS

(75) Inventors: Simon Walke, Basingstoke (GB); Nicholas J. Tebbit, Old Windsor (GB); Mungal S. Dhanda, Slough (GB)

(73) Assignee: QUALCOMM Incorporated, San Diego, CA (US)

( * ) Notice: Subject to any disclaimer, the term of this patent is extended or adjusted under 35 U.S.C. 154(b) by 528 days.

(21) Appl. No.: 13/244,015

(22) Filed: Sep. 23, 2011

(65) Prior Publication Data
US 2012/0218939 A1 Aug. 30, 2012

Related U.S. Application Data

(60) Provisional application No. 61/446,868, filed on Feb. 25, 2011.

(51) Int. Cl.
*H04W 4/00* (2009.01)
*H04L 29/06* (2006.01)
*H04W 12/02* (2009.01)

(52) U.S. Cl.
CPC ........... *H04L 63/1475* (2013.01); *H04W 12/02* (2013.01); *H04L 63/0428* (2013.01)
USPC .......................................... 370/328; 713/153

(58) Field of Classification Search
CPC ... H04L 63/0428; H04L 63/0442; H04L 9/00; H04L 63/162; H04L 63/04

USPC .......... 370/310, 328; 713/150, 151, 152, 153, 713/160, 161
See application file for complete search history.

(56) References Cited

U.S. PATENT DOCUMENTS

| 7,480,264 | B1 | 1/2009 | Duo et al. |
| 7,664,967 | B2 | 2/2010 | Thorpe |
| 7,885,405 | B1 * | 2/2011 | Bong ............................... 380/37 |
| 7,929,698 | B2 * | 4/2011 | Candelore ..................... 380/239 |
| 2004/0247126 | A1 * | 12/2004 | McClellan .................... 380/262 |
| 2007/0091886 | A1 * | 4/2007 | Davis et al. ................... 370/389 |

FOREIGN PATENT DOCUMENTS

GB 2459735 A * 11/2009

OTHER PUBLICATIONS

Bellare, et al., "The SecureShell (SSH) Transport Layer Encryption Modes," Network Working Group, RFC 4344, Jan. 2006, pp. 1-12.
International Search Report and Written Opinion—PCT/US2012/026835, International Search Authority—European Patent Office, Jul. 25, 2012.

* cited by examiner

*Primary Examiner* — Chi Pham
*Assistant Examiner* — Weibin Huang
(74) *Attorney, Agent, or Firm* — Won Tae Kim

(57) ABSTRACT

To reduce the effectiveness of eavesdropping attacks, a filler such as one utilized in a data frame for link-layer LAPDm signaling may be dynamically selected to utilize a first bit pattern (first filler) generated utilizing a first algorithm when the transmissions are unencrypted, and to utilize a second bit pattern (second filler) generated utilizing a second algorithm different from the first algorithm when the transmissions are encrypted.

32 Claims, 11 Drawing Sheets

DYNAMIC SELECTION AMONG ALGORITHMS FOR GENERATING FILLERS FOR SECURITY OF DATA COMMUNICATIONS

CROSS-REFERENCE TO RELATED APPLICATIONS

This application claims priority to and the benefit of provisional patent application No. 61/446,868, filed in the United States Patent and Trademark Office on Feb. 25, 2011, the entire content of which is incorporated herein by reference.

BACKGROUND

1. Field

The present disclosure generally relates to wireless communication system security, and more particularly, to various methods and devices for structuring data link layer frames to improve security in wireless communication systems.

2. Background

Wireless communication networks are widely deployed to provide various communication services such as telephony, video, data, messaging, broadcasts, and so on. Such networks, which are usually multiple access networks, support communications for multiple users by sharing the available network resources.

Communications over such a wireless network can be sensitive to the manipulation of mobile devices in an attempt to impersonate an authorized subscriber, and to eavesdropping of the information exchanged on the air interface. To mitigate these issues, various security features have been established within various wireless communication standards.

For example, security features provided in various wireless communication networks may include subscriber identity confidentiality and authentication, user data confidentiality, and signaling information element confidentiality. With respect to user data confidentiality, encryption may be applied to wirelessly exchanged information utilizing one or more suitable encryption algorithms. However, in some implementations encryption of the information can be enabled or disabled by the user, and further, test equipment may frequently utilize unencrypted communication signals. Here, it may be possible for an eavesdropping attacker to monitor unencrypted transmissions, determining certain patterns in the transmissions that can potentially be utilized to expose the underlying algorithms used to encrypt transmissions.

Therefore, a way is desired to reduce or minimize the security risk posed by using predictable patterns in encrypted wireless transmissions.

SUMMARY

One feature of the present disclosure provides for implementing different algorithms for the generation of fillers for LAPDm frames depending on whether encryption is being applied over the communication link. As one example, when the communication link is unencrypted, randomized fillers may be disabled and a static filler may be used instead. As another example, two different random generation algorithms may be utilized depending on whether the communication link is encrypted or not. Thus, transmitting devices may implement dynamic or intelligent switching between different algorithms for generating fillers based on whether the frames being transmitted are unencrypted or encrypted, respectively.

In one aspect of the disclosure, a method operational in an access node includes establishing a wireless communication link with a mobile device, and selecting between a first filler generated utilizing a first algorithm, and a second filler generated utilizing a second algorithm different from the first algorithm, for a frame to be transmitted on the wireless communication link. Here, the selecting is based at least in part on whether the frame to be transmitted is to be unencrypted or encrypted. Further, the method includes filling an unused portion of the frame utilizing at least one of the selected first filler or second filler, and transmitting the frame to the mobile device over the wireless communication link.

In another aspect of the disclosure, an access node includes a wireless communication interface adapted for wireless communication with at least one mobile device, and a processing circuit coupled to the wireless communication interface. Here, the processing circuit is adapted to establish a wireless communication link with a mobile device, to select between a first filler generated utilizing a first algorithm, and a second filler generated utilizing a second algorithm different from the first algorithm, for a frame to be transmitted on the wireless communication link, the selecting based at least in part on whether the frames to be transmitted are unencrypted or encrypted, to fill an unused portion of the frame utilizing at least one of the selected first filler or second filler, and to transmit the frame to the mobile device over the wireless communication link.

In another aspect of the disclosure, an access node includes means for establishing a wireless communication link with a mobile device, and means for selecting between a first filler generated utilizing a first algorithm, and a second filler generated utilizing a second algorithm different from the first algorithm, for a frame to be transmitted on the wireless communication link. Here, the selecting is based at least in part on whether the frame to be transmitted is to be unencrypted or encrypted. Further, the access node includes means for filling an unused portion of a frame utilizing at least one of the selected first filler or second filler, and means for transmitting the frame to the mobile device over the wireless communication link.

In another aspect of the disclosure, a processor-readable medium includes one or more instructions operational in an access node, which when executed by a processing circuit, cause the processing circuit to establish a wireless communication link with a mobile device, and to select between a first filler generated utilizing a first algorithm, and a second filler generated utilizing a second algorithm different from the first algorithm, for a frame to be transmitted on the wireless communication link. Here, the selecting is based at least in part on whether the frames to be transmitted are unencrypted or encrypted. Further, the processor-readable medium includes one or more instructions that when executed by the processing circuit cause the processing circuit to fill an unused portion of the frame utilizing at least one of the selected first filler or second filler, and to transmit the frame to the mobile device over the wireless communication link.

In another aspect of the disclosure, a method operational in a mobile device includes establishing a wireless communication link with an access node, and selecting between a filler generated utilizing a first algorithm, and a second filler generated utilizing a second algorithm different from the first algorithm, for a frame to be transmitted on the wireless communication link. Here, the selecting is based at least in part on whether the frame to be transmitted is to be unencrypted or encrypted. Further, the method includes filling an unused portion of the frame utilizing at least one of the selected first filler or second filler, and transmitting the frame to the access node over the wireless communication link.

In another aspect of the disclosure, a mobile device includes a wireless communication interface adapted for wireless communication with at least one access node, and a processing circuit coupled to the wireless communication interface. Here, the processing circuit adapted to establish a wireless communication link with an access node, and to select between a first filler generated utilizing a first algorithm, and a second filler generated utilizing a second algorithm different from the first algorithm, for a frame to be transmitted on the wireless communication link. The selecting is based at least in part on whether the frame to be transmitted is unencrypted or encrypted. Further, the processing circuit is adapted to fill an unused portion of the frame utilizing at least one of the selected first filler or second filler, and to transmit the frame to the access node over the wireless communication link.

In another aspect of the disclosure, a mobile device includes means for establishing a wireless communication link with an access node, and means for selecting between a first filler generated utilizing a first algorithm, and a second filler generated utilizing a second algorithm different from the first algorithm, for a frame to be transmitted on the wireless communication link. Here, the selecting is based at least in part on whether the frame to be transmitted is to be unencrypted or encrypted. Further, the mobile device includes means for filling an unused portion of the frame utilizing at least one of the selected first filler or second filler, and means for transmitting the frame to the access node over the wireless communication link.

In another aspect of the disclosure, a processor-readable medium includes one or more instructions operational on a mobile device, which when executed by a processing circuit, cause the processing circuit to establish a wireless communication link with an access node, and to select between a first filler generated utilizing a first algorithm, or a second filler generated utilizing a second algorithm different from the first algorithm, for a frame to be transmitted on the wireless communication link. Here, the selecting is based at least in part on whether the frame to be transmitted is unencrypted or encrypted. Further, the processor-readable medium includes instructions that when executed cause the processing circuit to fill an unused portion of the frame utilizing at least one of the selected first or second filler, and to transmit the frame to the access node over the wireless communication link.

BRIEF DESCRIPTION OF THE DRAWINGS

The accompanying drawings, together with the specification, illustrate exemplary aspects of the present disclosure, and, together with the description, serve to explain the principles of the present invention.

DETAILED DESCRIPTION

Figure 1:
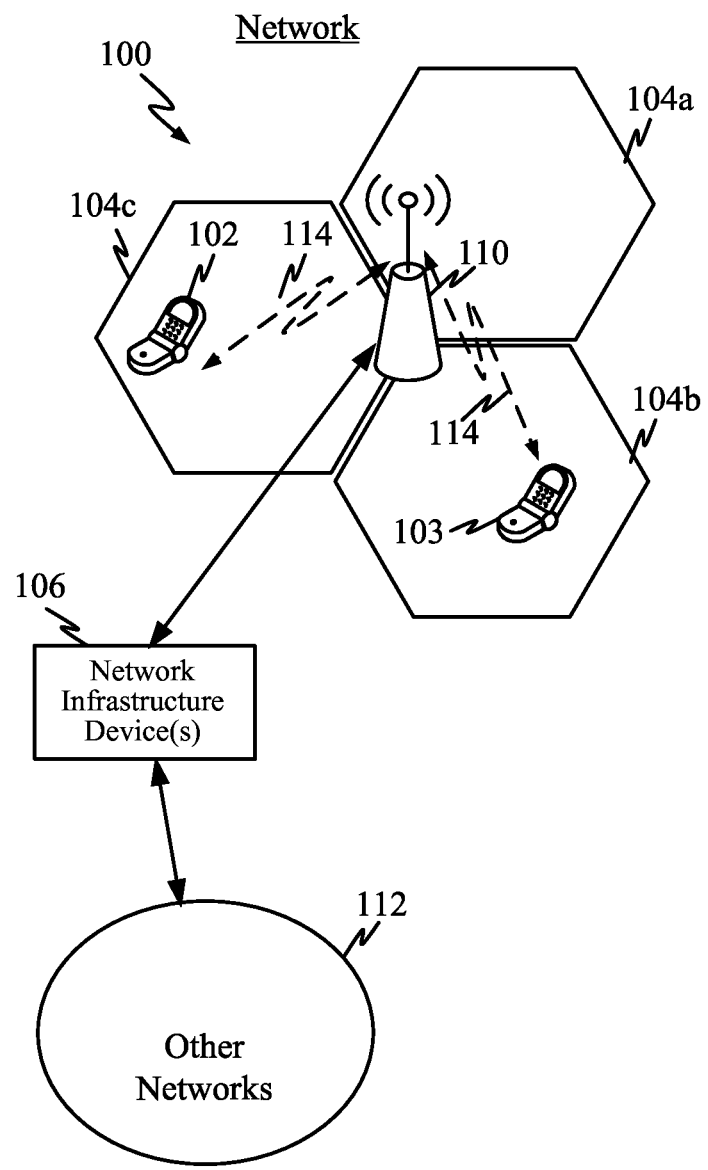
FIG. 1 is a simplified drawing schematically illustrating a GSM network.

In the following description, specific details of certain examples of the present invention are shown and described to provide a thorough understanding of those examples. However, it will be understood by one of ordinary skill in the art that the present invention may be embodied in many different forms and may be practiced without these specific details. For example, circuits may be shown in block diagrams, or not be shown at all, in order not to obscure the embodiments in unnecessary detail. In other instances, well-known circuits, structures and techniques may not be shown in detail in order not to obscure the embodiments. Therefore, the invention should not be construed as being limited to the specific examples set forth herein.

Further, while the following description may utilize a Global System for Mobile (GSM) communication system as a specific example, those skilled in the art will recognize that this particular system is merely exemplary in nature to aid in describing details of one example; however, aspects of the disclosure may be implemented in any suitable communication system in addition to a GSM system. For example, aspects of the disclosure may be applicable for communications at the data link layer over any suitable wireless link, or at a higher layer, up to and including the application layer, for providing security for a particular application.

3GPP specifications relevant to GSM (e.g., 3GPP TS 04.06, V8.4.0, Clause 2.2; and 3GPP TS 44.006, V9.1.0, Clause 5.2, which are publically available and incorporated herein by reference) indicate that signaling frames for Link Access Procedures on the Dm channel (LAPDm) may use randomized bits or bytes (referred to hereinafter as "fillers") in unused payload portions of a payload. That is, LAPDm signaling frames sent over GSM dedicated mode (i.e. circuit-switched) connections may set each fill bit to a random value, generally generated utilizing a pseudo-random number (PN) generator, or alternatively may utilize a static bit pattern (e.g., 0x2B) to fill any unused octets of a payload.

Moreover, the Um interface, over which LAPDm signaling frames are sent, may be encrypted for improved security.

When the signaling frames are encrypted, the use of the static pattern for the filler in sequential frames may allow an eavesdropping attacker over time to identify elements within the encrypted data stream, potentially allowing the attacker to expose the underlying ciphering algorithms and thereby creating a security risk. On the other hand, when the signaling frames are not encrypted, the use of the random pattern for the fillers in sequential frames may allow the eavesdropping attacker over time to detect a sufficient number of randomized fillers to compromise the PN generation algorithm used for randomization. With this information, the attacker may similarly be enabled to expose the underlying ciphering algorithm when the same, predictable PN generator is utilized.

Additionally, some networks and/or devices may not support the use of randomized fillers and/or may expect static fillers to be used instead. Consequently, such networks and/or devices may be hampered by the use of unexpected randomized fillers as part of a payload of a frame.

Consequently, one feature of the present disclosure provides for implementing different algorithms for the generation of fillers for LAPDm frames depending on whether encryption is being applied over the communication link. As one example, when the communication link is unencrypted, randomized fillers may be disabled and a static filler may be used instead. As another example, two different random generation algorithms may be utilized depending on whether the communication link is encrypted or not. Thus, transmitting devices may implement dynamic or intelligent switching between different algorithms for generating fillers based on whether the frames being transmitted are unencrypted or encrypted, respectively.

Exemplary Network

Various representative implementations of the present invention may be applied to any suitable system or network for wireless communications. Certain representative implementations may include, for example, a cellular network 100 as illustrated in the block diagram of FIG. 1, which may utilize GSM technology. The network 100 may include an access node 110 (also known as a base station and/or access point) providing wireless network access over a wireless interface 114 (e.g., a Um interface utilizing GSM terminology) to one or more mobile devices 102 and 103 (also known as mobile stations (MS) user equipment (UE), access terminals (AT), and/or wireless terminals) operating within one or more cells 104a, 104b, and/or 104c. The access node 110 may be communicatively coupled to one or more network infrastructure devices 106 that facilitate communications with other networks 112.

Um Interface Protocol Stack

Figure 2:
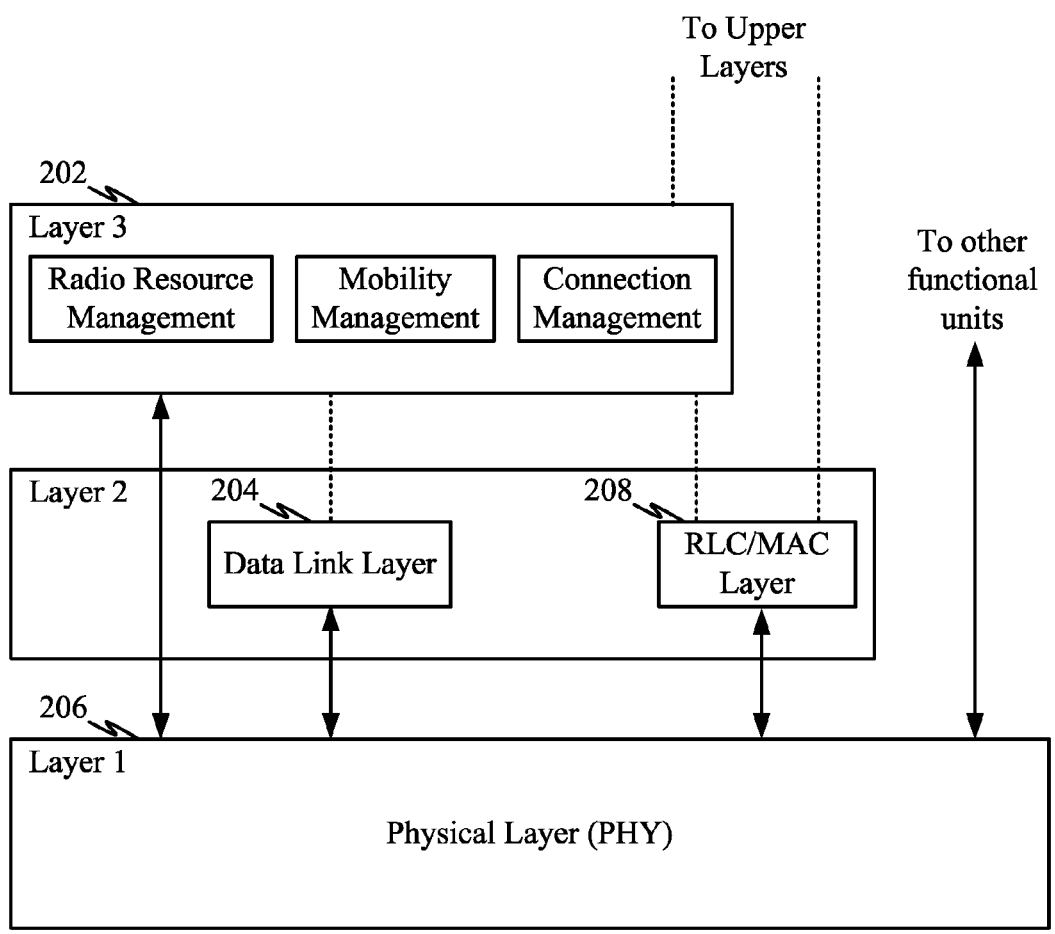
FIG. 2 is a block diagram illustrating a communication protocol stack for communication over a Um interface in a GSM network.

In accordance with the Open System Interconnection (OSI) reference model, the signaling protocols utilized for the air interface between the access node 110 and the mobile devices 102 and 103 (e.g., the Um interface 114) are generally structured in layers. That is, communication between nodes can be viewed as being logically partitioned into an ordered set of layers that may be visualized as a protocol stack as illustrated in FIG. 2. A similar arrangement may be utilized from the viewpoint of the access node 110 and one or more mobile devices, e.g., mobile devices 102 and 103. For signaling on the Um interface 114, three layers may be utilized.

Layer 3, 202 may include functional entities for radio resource management, mobility management, and connection management. Messages sent by these functional entities over the Um interface 114 may utilize a Layer 3 peer-to-peer protocol, which may be carried by a data link connection at the data link layer 204.

Layer 2 may include the data link layer 204, which may receive services from the physical layer (PHY) 206 and may provide services to Layer 3, 202. For example, for an exchange of information between different Layer 3 entities (e.g., one at the access node 110 and the other at the mobile device 102), an association may be established between those Layer 3 entities in the data link layer 204 utilizing a data link layer protocol, e.g., the Link Access Procedures on the Dm channel (LAPDm) protocol. For example, information may be conveyed between different Layer 3 entities by the data link layer 204 utilizing the LAPDm protocol across the GSM radio interface (i.e., the Um interface) using the Dm channel. Here, the term "Dm channel" broadly refers to the collection of various signaling channels utilized in the GSM network. Further, the data link layer messages may be conveyed between the respective data link layer entities over the PHY 206 by means of a physical layer connection.

Layer 1 is the PHY 206, and is the lowest layer in the OSI reference model, supporting the transmission of bit streams on the physical medium. The PHY 206 may interface the data link layer 204, the radio link control and medium access control (RLC/MAC) layer 208, the radio resource management entity of Layer 3, 202, and other supported functional units for supporting traffic channels. Details of the PHY 206 may vary in accordance with a particular implementation, and are within the knowledge of those of ordinary skill in the art, and are therefore not described in detail in the present disclosure. In general, the PHY 206 may include hardware such as an RF front end, processing circuits, transmitters, receivers, an antenna, memory, etc.

Exemplary Frame

In accordance with 3GPP TS 04.06 V8.4.0, Clauses 2 and 3; and 3GPP TS 44.006, V9.1.0, Clauses 5 and 6, which are publically available and incorporated herein by reference, the LAPDm protocol is generally utilized for information sent over the Um interface on the control channels BCCH, CCCH (i.e., AGCH, NCH, and PCH), and DCCH (i.e., FACCH, SACCH, and SDCCH), although more or less channels may be included within the scope of the present disclosure. On these channels, data link layer peer-to-peer exchanges are generally provided in frames, which may take any suitable one of several format types. In general, the frames may include a header having fields such as an address field, a control field, and/or a length indicator field; a payload having an information field; and/or fill bits.

Figure 3:
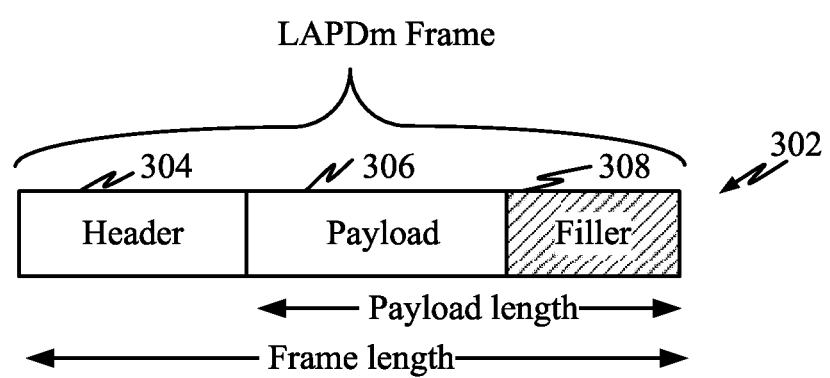
FIG. 3 is a diagram schematically illustrating a data frame for carrying information under the LAPDm protocol.

FIG. 3 is a simplified diagram schematically illustrating an exemplary frame 302 for data link layer messages. In this example, the frame 302 may be a LAPDm frame having a header portion 304 and a payload portion 306. In this example, the frame 302 may have a fixed length known to the receiving entity. In another example, the header portion 304 of the frame 302 may include a length indicator field indicating a greater length than that of the information transmitted, such that the payload may not be fully filled. Thus, when the payload portion 306 of the frame is not fully filled (e.g., the data portion is smaller than the payload length), the unused space may be padded with a filler 308. The filler 308 may be a static filler (e.g., one or more instances of the octet "0x28") or a randomized filler generated by a random number generator. Here, a random number generator may include any suitable random number generator, including but not limited to a pseudo-random number (PN) generator. This or any other suitable type of frame may be used when dynamically selecting between static and randomized fillers.

In some aspects of the present disclosure, when a frame is said to be encrypted, in some implementations, the whole frame 302 may be encrypted for secured transmission. In other implementations, only the payload portion (including the fillers) may be encrypted for secured transmission.

Returning now to FIG. 1, the wireless link 114 between the mobile device 102 and the access node 110 may be encrypted or unencrypted, as directed by the one or more network infrastructure devices 106, the access node 110, the mobile device 102, or any other suitable node. In accordance with an aspect of the disclosure, when the wireless link is unencrypted (e.g., frames are not encrypted or otherwise protected), the fillers 308 used to fill unused portions of a payload 306 within the frames 302 may be static fillers (e.g., the same octet or bit patterns may be used for all frames). When the wireless link becomes encrypted (e.g., frames are encrypted or otherwise protected), the fillers 308 used to fill the unused portions of the payload 306 within the frames 302 may be randomized fillers. For example, the bit pattern for the filler 308 may be generated by a suitable pseudo-random number (PN) generator. Thus, the mobile device 102 and/or access node 110 may be configured to dynamically or intelligently switch between static fillers and randomized fillers based on whether the frames being transmitted are unencrypted or encrypted, respectively. In one example, such dynamic selection between static and randomized fillers may occur when the communication link 114 is a GSM dedicated mode connection (e.g., a circuit-switched link). Such dedicated mode connection is often used for voice, network registration (e.g., mobility signaling), Short Message Services (SMS), or even fax and/or circuit-switched data.

Security Risk Scenarios

Figure 4:
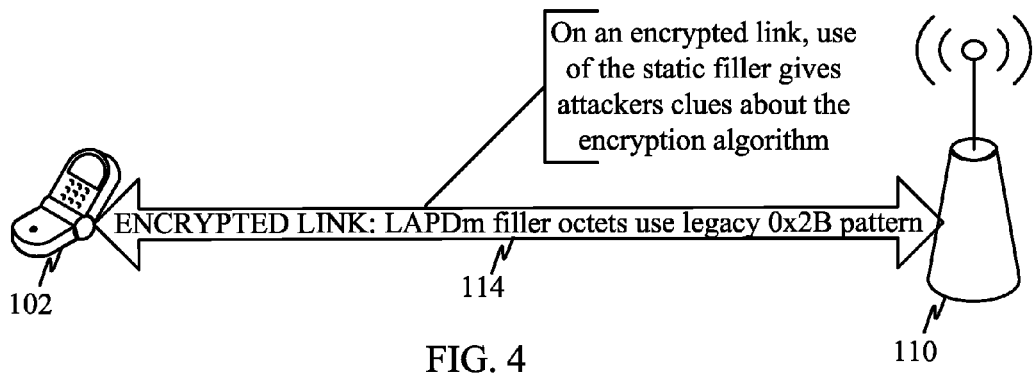
FIG. 4 is a schematic diagram illustrating some of the risks that may arise when using a static filler in frames transmitted over an encrypted wireless link.

FIG. 4 is a block diagram illustrating some of the risks that may arise when using a static filler in frames transmitted over an encrypted wireless link. Here, the frames including the static filler, transmitted between the mobile device 102 and the access node 110 over the wireless link 114, are encrypted (e.g., ciphered or secured). In this example, the static filler used may be a hexadecimal "0x2B" pattern. This approach is susceptible to cryptanalytic attacks because it provides a way to recognize parts of the encrypted data stream (e.g., plurality of frames) over the wireless link 114. That is, because the static filler is repeating, an attacker may try to exploit this repeating pattern to recognize frames even when the data stream is encrypted.

Figure 5:
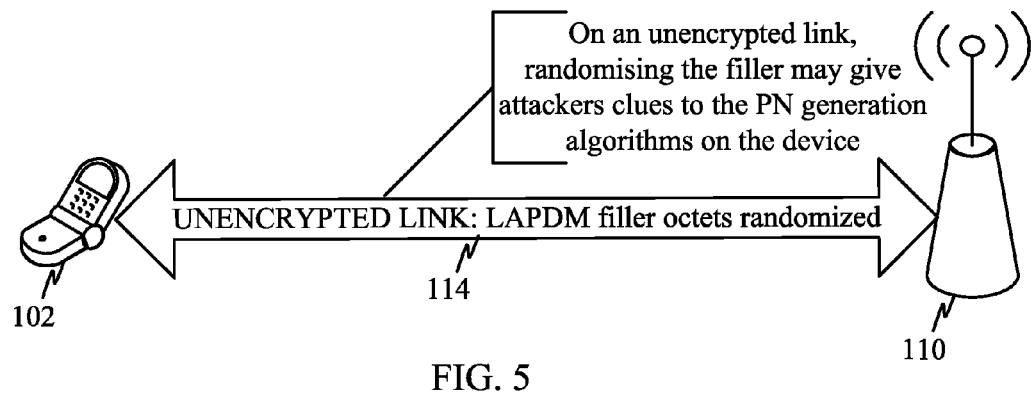
FIG. 5 is a schematic diagram illustrating some of the risks that may arise when using a randomized filler in frames transmitted over an unencrypted wireless link.

FIG. 5 is a block diagram illustrating some of the risks that may arise when using a randomized filler in frames transmitted over an unencrypted wireless link. Using random fillers over an unencrypted wireless link 114 may be considered wasteful, as the randomization fails to improve the security of the transmission. Further, using random fillers over the unencrypted wireless link 114 may also result in an increased security risk. That is, in the unencrypted wireless link 114, the frames are unsecured (e.g., the payload in the frames may be in plain text). However, because the payload is plain text, it is readily identifiable by an attacker. The attacker may then attempt to detect a sufficient number of randomized fillers to compromise the PN generation algorithm used for randomization.

On some networks, the LAPDm link may remain unencrypted for a short initial period during connection establishment. On other networks, or in GSM test equipment, encryption may never be engaged at all. In both of these cases, using randomized fillers without ciphering may actually expose the algorithms used by the underlying pseudo-random number PN generator. Such exposure may result in a security vulnerability.

Figure 6:
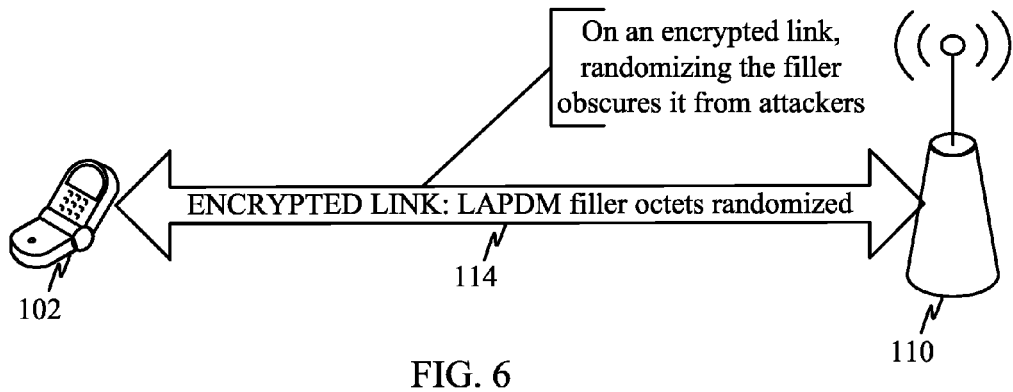
FIG. 6 is a schematic diagram illustrating the use of randomized fillers in frames transmitted over an encrypted link.

FIG. 6 is a block diagram illustrating the use of randomized fillers in frames transmitted over an encrypted link. By using random fillers in the frames transmitted frames over an encrypted wireless link 114, the filler is obscured from attackers, thereby making it very difficult to identify frames and/or their payload.

However, devices that implement this randomized filler scheme may inadvertently cause unexpected network behavior, because the random content may not be expected. For instance, devices undergoing acceptance testing may encounter network simulators that may expect static fillers and may not be able to exchange signaling frames with a device that utilizes randomized fillers. Simply reverting to legacy behavior (e.g., as in FIG. 4) may not be desired because it may expose the security flaw that the randomized filler is intended to avoid.

As specified by 3GPP GSM EDGE Radio Access Network Specifications (e.g., 3GPP TS 44.006, V9.1.0), filler randomization may be applied to all connections, whether or not encryption is in use. However, networks and system simulators (GSM test equipment) may not have to engage encryption algorithms for every connection. If the wireless link between the mobile device 102 and the network access node 110 is unencrypted, randomizing the filler octets provides no practical benefit, since the signaling payload is already in plain text, and using the randomized filler under these conditions may in fact be detrimental to the overall security.

Selective Filler Generation

Figure 7:
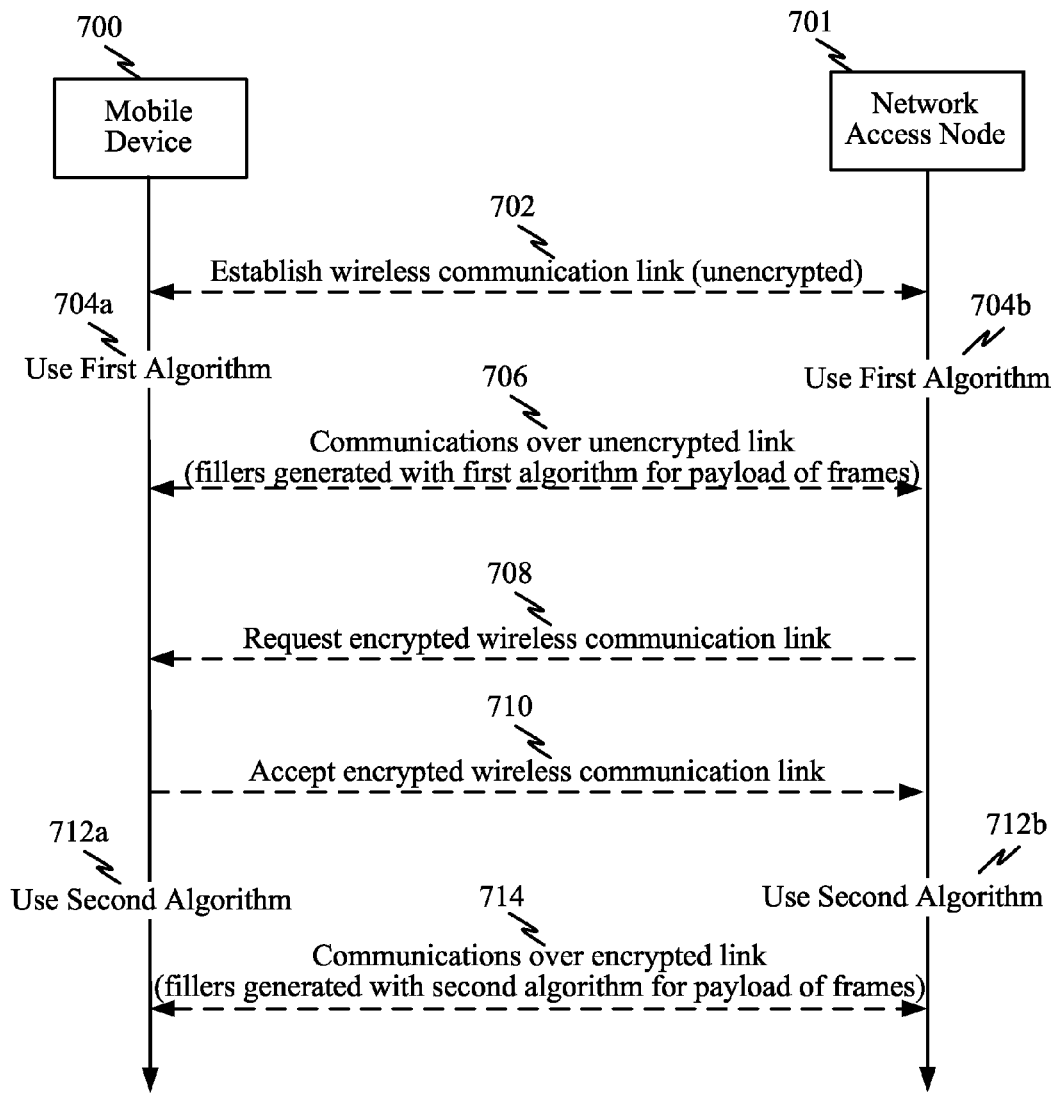
FIG. 7 is a simplified call flow diagram illustrating the operation of a mobile device and a network access node to dynamically implement filler randomization.

FIG. 7 is a call flow diagram illustrating the operation of a mobile device 700 and a network access node 701 to selectively or dynamically implement filler randomization in accordance with an aspect of the present disclosure. The mobile device 700 and the access node 701 may perform one or more operations to establish a wireless communication link for unencrypted frame exchanges 702. Both the mobile device 700 and access node 701 may use fillers 704*a* and 704*b* generated utilizing a first algorithm to fill up any spare space in the payload of the frames. In some examples, the first algorithm may be configured to generate a static filler including a repeated binary value. In other examples, the first algorithm may be configured to generate a randomized filler utilizing a suitable pseudo-random number generator. The mobile device 700 and access node 701 may then communicate over the unencrypted link using the fillers 706 generated with the first algorithm to fill otherwise unused space in the payload portion of the frames of a data stream.

Subsequently, the access node 701 may send a message or request to the mobile device 700 indicating that the wireless communication link should use encrypted frames 708. The mobile device 700 may accept the request 710, and thereafter both the mobile device 700 and access node 701 may switch to using fillers 712*a* and 712*b* generated utilizing a second algorithm, different from the first algorithm. In an aspect of the present disclosure, the second algorithm may be configured to generate a randomized filler utilizing a suitable pseudo-random number generator. In an example where the first algorithm generates a (first) randomized filler, the second algorithm may be configured to generate a distinct (second) randomized pattern, utilizing a different pseudo-random number generation algorithm than the one utilized by the first algorithm. Subsequent communications over the wireless communication link may then be performed using frame encryption and fillers generated with the second algorithm. The mobile device 700 and access node 701 may revert back to using fillers generated with the first algorithm when unencrypted frames are used.

In this manner, the access node 701 and mobile device 700 may dynamically switch between using first fillers generated with the first algorithm and second fillers generated with the second algorithm depending on whether the frames being transmitted are unencrypted or encrypted, respectively.

In this manner, the algorithm utilized for generating the filler be selected based on whether the wireless communication link (e.g., a LAPDm signaling link) is encrypted (e.g., signaling frames are encrypted). This can potentially provide two advantages. First, on network devices (e.g., system simulators for GSM test equipment) that do not support the randomized filler requirement, use of the random filler (e.g., randomized octets) may cause a protocol level failure if the network device is validating the presence of a static filler pattern. On test equipment, the LAPDm link is not always encrypted (for ease of implementation). Disabling the randomized filler for unencrypted links may therefore provide benefit to device manufacturers who do not have the latest test equipment. Second, using randomized fillers only after a link has become ciphered, or utilizing a different randomization algorithm after a link has become ciphered, may hinder or prevent exposing the algorithm(s) used by the underlying pseudo-random number (PN) generator used in randomizing the fillers.

Exemplary Access Node and Operation Thereof

Figure 8:
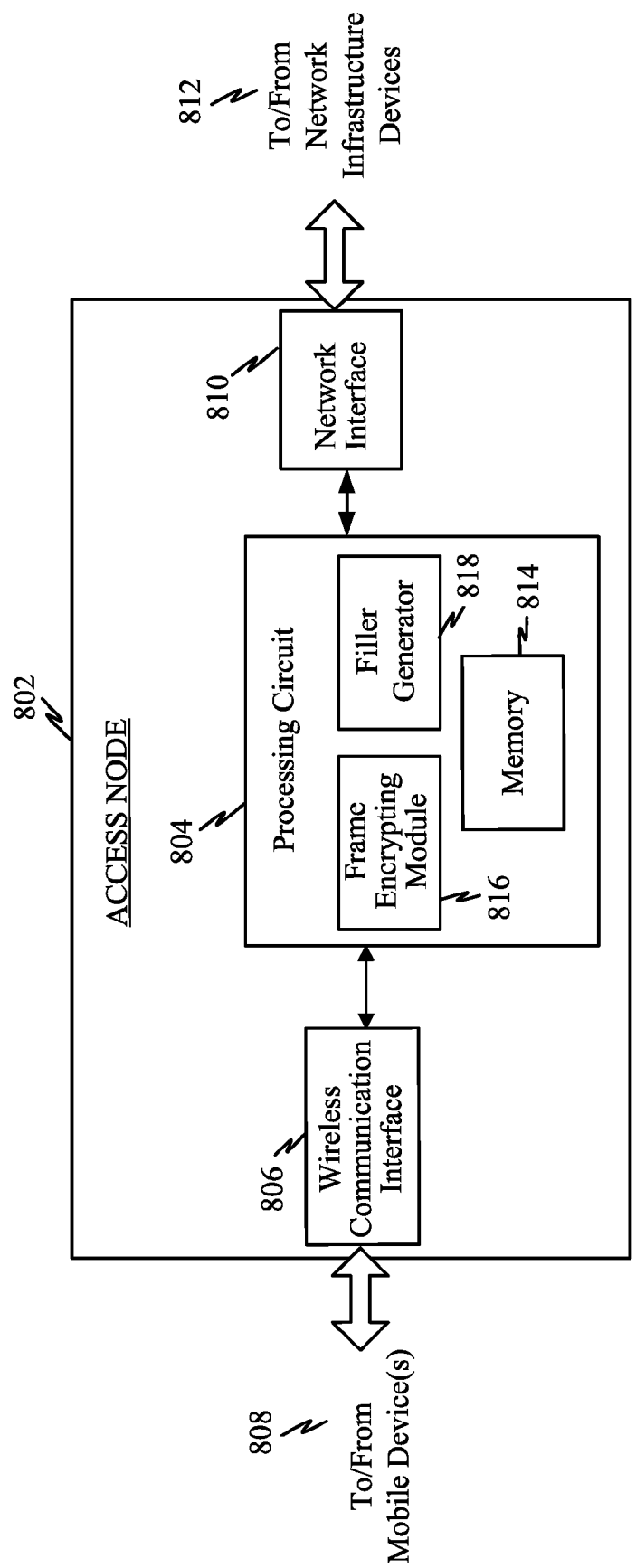
FIG. 8 is a block diagram illustrating an exemplary access node.

FIG. 8 is a block diagram illustrating an exemplary access node that may be utilized in accordance with various aspects of the present disclosure. The access node 802 may include a processing circuit 804 coupled to a wireless communication interface 806 and a network interface 810. The wireless communication interface 806 may include a circuit (e.g., transceiver) that allows the access node 802 to communicate with one or more mobile devices over a wireless link 808, such as the Um interface. The network interface 810 may include a circuit (e.g., transceiver) that allows the access node 802 to communicate, e.g., over a backhaul interface 812, with one or more network infrastructure devices. The processing circuit 804 may be configured to manage communications (e.g., protocol translation, movement of frames, etc.) between the wireless communication interface 806 and the network interface 810. The processing circuit 804 may implement a filler generator 818 used to generate static and/or random fillers that may be used to fill spare payload portions of a frame for transmission to the one or more mobile devices 808. For example, the filler generator 818 may include a pseudo-random number (PN) generating circuit. In one example, the filler generator 818 may implement two distinct pseudo random number generators, where a first pseudo random number generator is utilized for a ciphered link, and a second pseudo random number generator is utilized for an unciphered link. In another example, the filler generator 818 may implement a pseudo random number generator, used for a ciphered link, and a constant or static padding generator (e.g., generating a single binary value/string, or pre-defined value, etc.), used for an unciphered link.

The processing circuit 804 may also implement a frame encrypting module 816 that may serve to encrypt or cipher all or part of a frame. Further, the processing circuit 804 may include memory 814. The processing circuit 804 may be configured to ascertain whether encrypted frames or unencrypted frames will be transmitted and dynamically select between randomized or static fillers, respectively, for such frames, in accordance with the determination whether encrypted frames or unencrypted frames will be transmitted.

Figure 9:
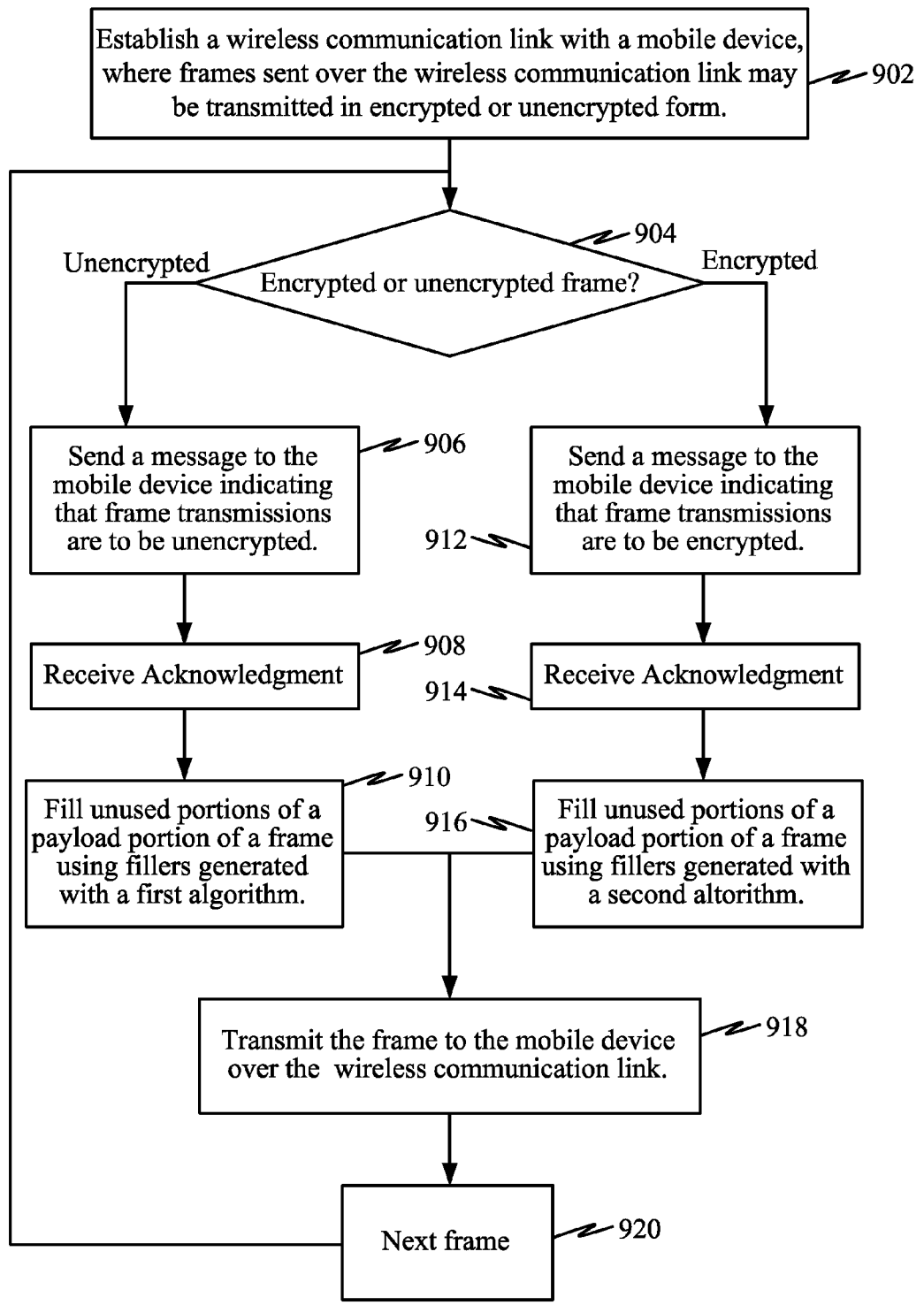
FIG. 9 is a flow chart illustrating the operation of an access node to dynamically implement filler randomization.

FIG. 9 is a flow diagram illustrating the operation of the access node 802 in accordance with some aspects of the present disclosure. Here, the access node 802 may establish a wireless communication link (e.g., a link layer connection over the Um interface utilizing the LAPDm protocol, or any other suitable link) with a mobile device through which frames may be transmitted in encrypted or unencrypted form 902. The access node 802 may be adapted to dynamically select between static fillers or randomized fillers depending on whether the frames to be transmitted are unencrypted or encrypted, respectively. Thus, the access node 802 may determine whether the frames to be transmitted are unencrypted or encrypted 904.

If the frame to be transmitted is unencrypted, the access node 802 may send a message to the mobile device indicating that frame transmissions over the wireless communication link 808 are to be unencrypted 906. In response, the access node 802 may receive an acknowledgment or acceptance from the mobile device to utilizing unencrypted frames 908. The access node 802 may fill or pad unused portions of a payload portion of a frame using the selected fillers 910 generated with a first algorithm. For instance, the access node 802 may select a pre-determined static filler. In another example, the access node 802 may select a randomized filler generated with a first randomization algorithm.

If, on the other hand, the frame to be transmitted is encrypted, the access node 802 may send a message to the mobile device indicating that frame transmissions over the wireless communication link 808 are to be encrypted 912. In response, the access node 802 may receive an acknowledgement or acceptance from the mobile device to utilizing encrypted frames 914. The access node 802 may fill or pad unused portions of the payload portion of the frame using the selected fillers 916 generated with a second algorithm, different from the first algorithm. For instance, the access node 802 may generate randomized fillers using a pseudo-random number (PN) generation algorithm. Here, in an example where the first algorithm generates a randomized filler with a first pseudo-random number generation algorithm, the fillers 916 generated with the second algorithm may be generated with a different pseudo-random number generation algorithm.

The access node 802 may then transmit the frame to the mobile device over the wireless communication link 918. This process may be repeated for the next frame 920, and potentially for all frames to be transmitted. Of course, in some aspects of the disclosure, some of the steps described above, such as the sending of the message indicating whether the frames are to be encrypted and receiving of the acknowledgment message, may be omitted for some of the frames, and may be limited to utilization only when changing between the transmission of encrypted and unencrypted frames, or at any other suitable interval. Further, one or more frames may also be received by the access node 802 from the mobile device, where such received frames may use fillers generated with the second algorithm if the received frames are encrypted or fillers generated with the first algorithm if the received frames are unencrypted.

Figure 10:
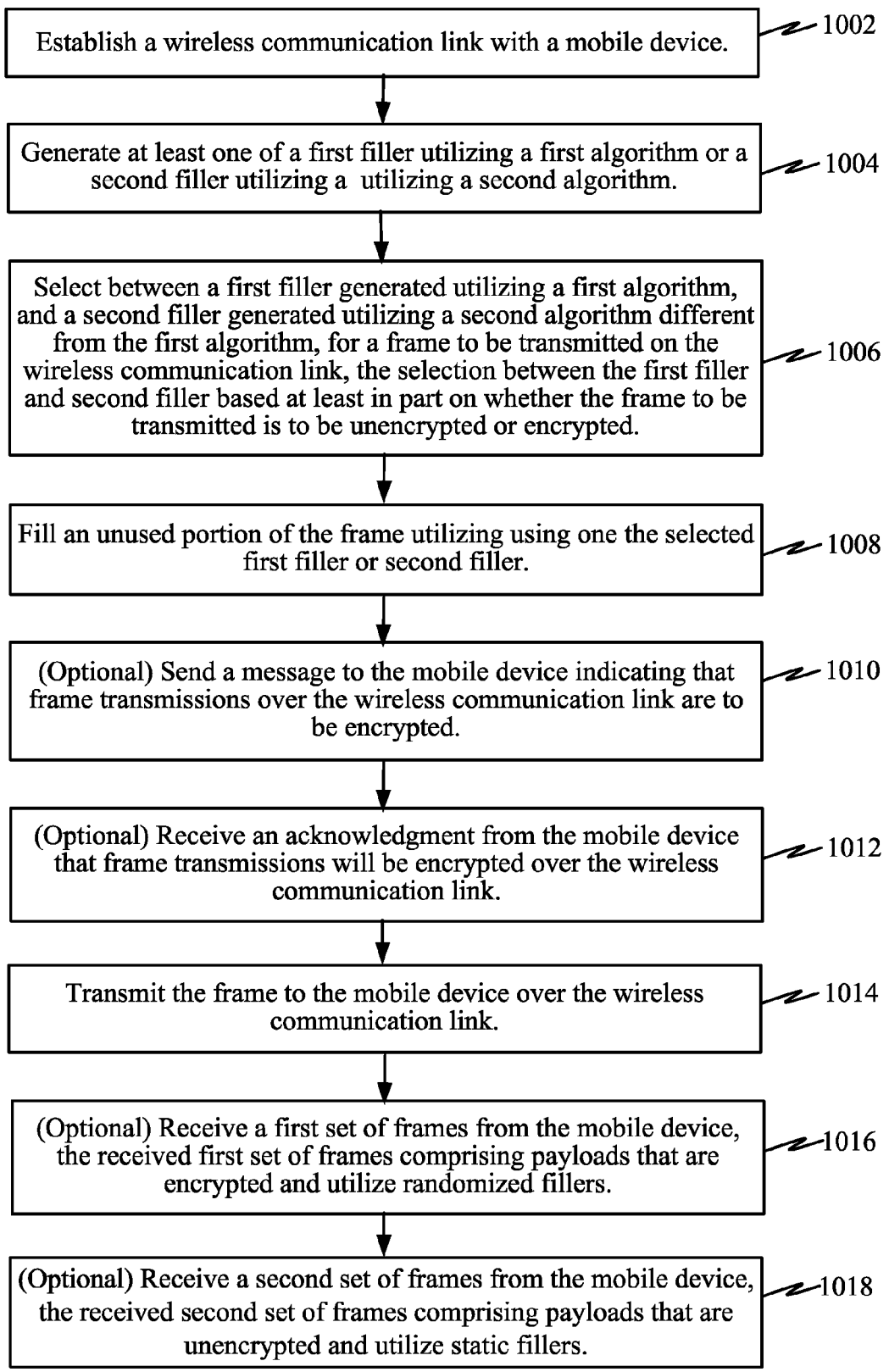
FIG. 10 is a flow diagram illustrating a method operational on an access node to utilize different types of fillers depending on the communication link.

FIG. 10 is a flow diagram illustrating a method operational on an access node 802 to utilize different types of fillers depending on the communication link. A wireless communication link (e.g., dedicated mode connection or a circuit-switched connection) may be established between the access node and a mobile device 1002. The access node may generate at least one of a first filler (utilizing a first algorithm) or a second filler (utilizing a second algorithm) 1004. The first and/or second algorithm may be a random number generation algorithm. The access node may then select between a first filler generated utilizing a first algorithm, and a second filler generated utilizing a second algorithm different from the first algorithm, for a frame to be transmitted on the wireless communication link, the selection between the first filler and second filler based at least in part on whether the frame to be transmitted is to be unencrypted or encrypted 1006. An unused portion of the frame may be filled utilizing at least one of the selected first filler or second filler 1008. In one example, the first filler may be selected when the frame to be transmitted is to be unencrypted (e.g., the first filler may be a static filler or a first randomized filler). In another example, the second filler may be selected when the frame to be transmitted is to be encrypted (e.g., the second filler may be a second randomized filler).

Optionally, the access node may send a message to the mobile device indicating that frame transmissions over the wireless communication link are to be encrypted 1010. In turn, the access node may receive an acknowledgment from the mobile device indicating that frame transmissions will be encrypted over the wireless communication link 1012.

The access node may then transmit the frame to the mobile device over the wireless communication link 1014. The frame may be encrypted prior to transmission. In one example, the transmitted frame may comprise a frame for Link Access Procedures on the Dm channel (LAPDm) signaling.

In some optional implementations, the access node may receive a first set of frames from the mobile device, the received first set of frames comprising payloads that are encrypted and utilize randomized fillers 1016. The access node may also receive a second set of frames from the mobile device, the received second set of frames comprising payloads that are unencrypted and utilize static fillers 1018.

Exemplary Mobile Device and Operation Thereof

Figure 11:
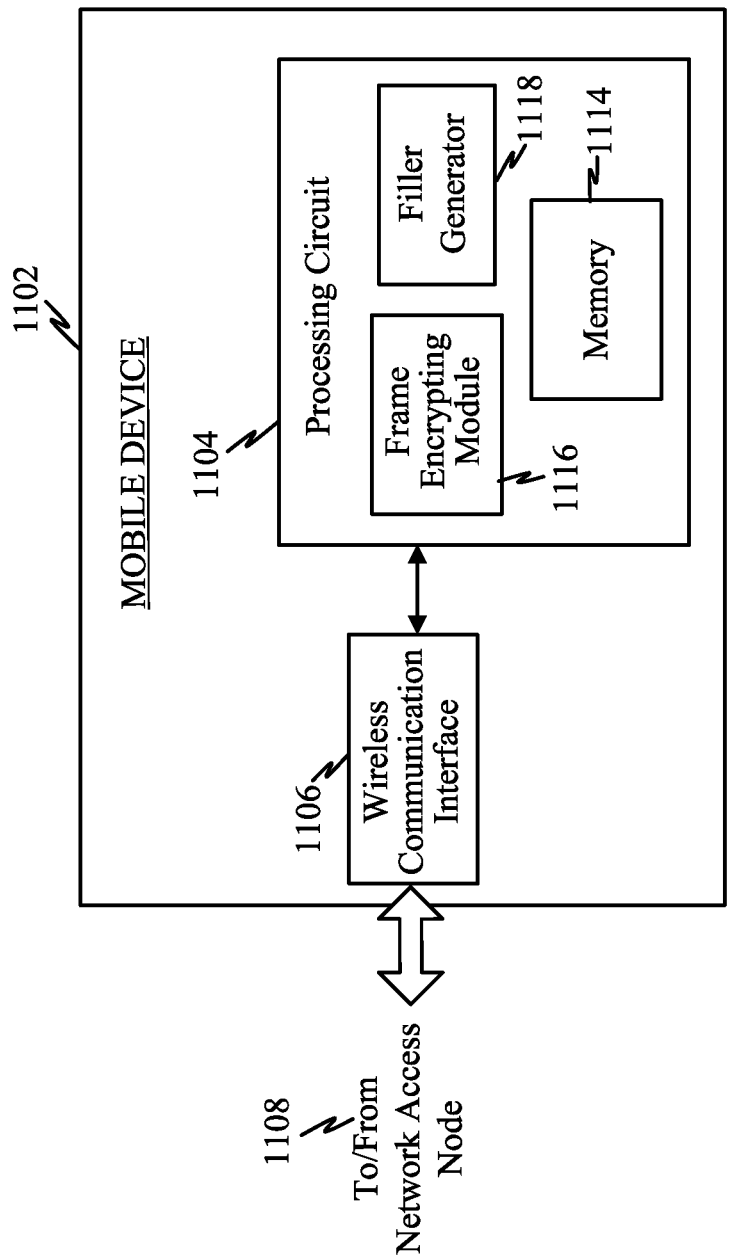
FIG. 11 is a block diagram illustrating an exemplary mobile device.

FIG. 11 is a block diagram illustrating an exemplary mobile device that may be utilized in accordance with various aspects of the present disclosure. The mobile device 1102 may include a processing circuit 1104 coupled to a wireless communication interface 1106. The wireless communication interface 1106 may include a circuit (e.g., transceiver) that allows the mobile device 1102 to communicate with a network access node 1108 over a wireless link. The processing circuit 1104 may be configured to manage communications (e.g., protocol translation, movement of frames, etc.) to/from the wireless communication interface 1106. The processing circuit 1104 may implement a filler generator 1118 to generate static and/or random fillers that may be used to fill otherwise unused payload portions of a frame for transmission to the network access node 1108. For example, the filler generator 1118 may include one or more pseudo-random number (PN) generator circuit(s). For example, the filler generator 1118 may include a pseudo-random number (PN) generating circuit. In one example, the filler generator 1118 may implement two distinct pseudo random number generators, where a first pseudo random number generator is utilized for a ciphered link, and a second pseudo random number generator is utilized for an unciphered link. In another example, the filler generator 1118 may implement a pseudo random number generator, used for a ciphered link, and a constant or static padding generator (e.g., generating a single binary value/string, or pre-defined value, etc.), used for an unciphered link.

The processing circuit 1104 may also implement a frame encrypting module 1116 that may serve to encrypt all or part of a frame. Further, the processing circuit 1104 may include memory 1114. The processing circuit 1104 may be configured to ascertain whether encrypted frames or unencrypted frames will be transmitted and dynamically select between a first algorithm for generating fillers or a second algorithm different from the first algorithm for generating fillers, respectively, for such frames.

Figure 12:
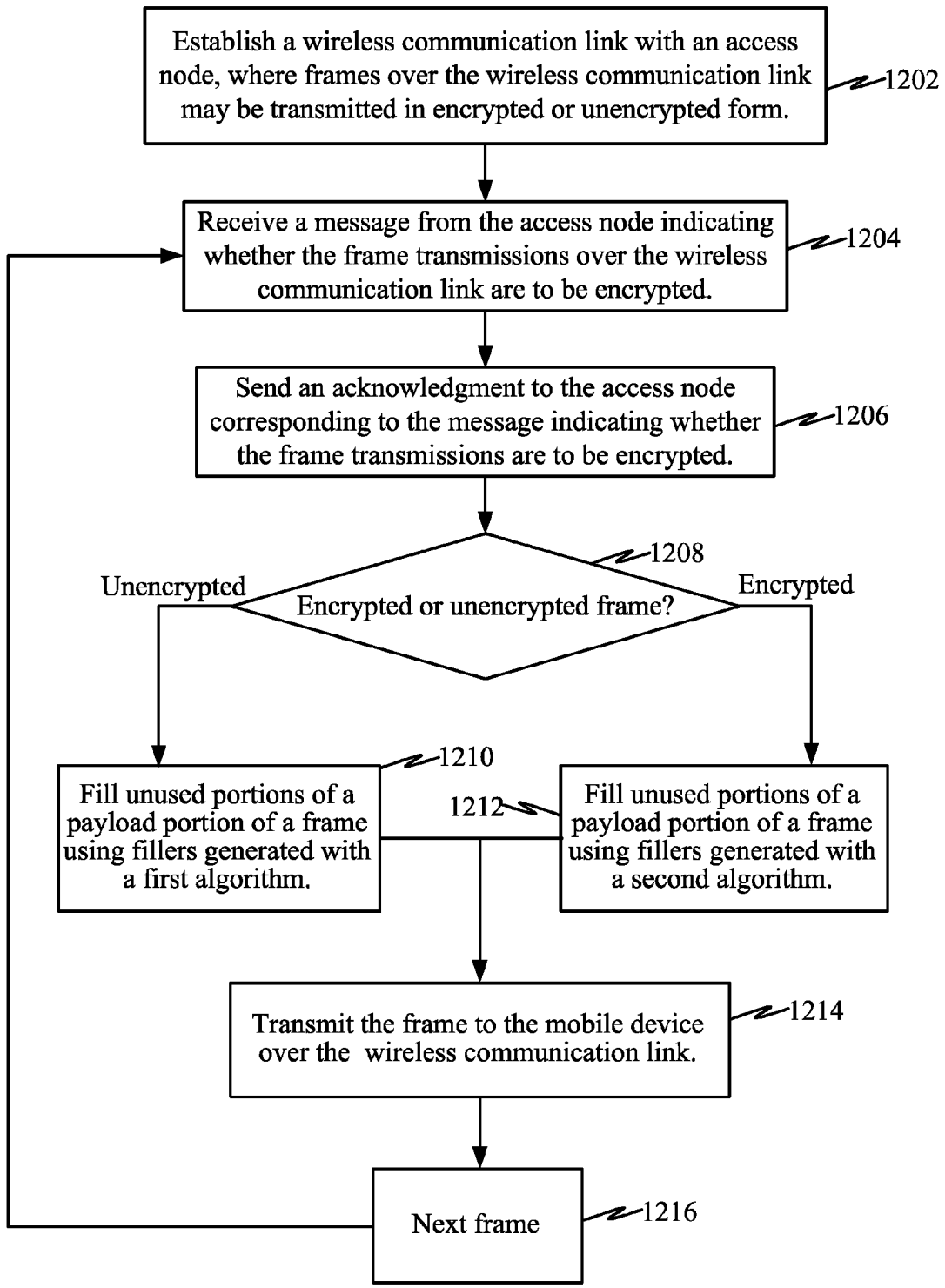
FIG. 12 is a flow chart illustrating the operation of a mobile device to dynamically implement filler randomization.

FIG. 12 is a flow diagram illustrating the operation of the mobile device 1102 in accordance with some aspects of the present disclosure. Here, the mobile device 1102 may establish a wireless communication link (e.g., a link layer connection over the Um interface utilizing the LAPDm protocol, or any other suitable link) with an access node through which frames may be transmitted in encrypted or unencrypted form 1202. The mobile device 1102 may dynamically select between (first) fillers generated with a first algorithm or (second) fillers generated with a second algorithm different from the first algorithm, depending on whether the frames to be transmitted are unencrypted or encrypted, respectively.

In some aspects of the disclosure, the mobile device 1102 may determine whether the frames are to be unencrypted or encrypted. In other aspects of the disclosure, the mobile device 1102 may receive a message from the access node indicating whether the frame transmissions over the wireless communication link are to be encrypted or unencrypted 1204. In response, the mobile device may send an acknowledgement or acceptance to the access node corresponding to the message indicating whether the frame transmissions are to be encrypted 1206. Further, based on the message from the access node, the mobile device 1102 may determine whether the frame transmissions are to be encrypted 1208.

If the frame to be transmitted is unencrypted, the mobile device 1102 may fill or pad unused portions of a payload portion of a frame using the selected fillers 1210 generated utilizing a first algorithm. For instance, the mobile device 1102 may select a pre-determined static filler. In another example, the mobile device 1102 may select a randomized filler generated with a suitable pseudo-random number generation algorithm. If, on the other hand, the frame to be transmitted is encrypted, the mobile device 1102 may fill or pad unused portions of the payload portion of the frame using the selected fillers 1212 generated utilizing a second algorithm, different from the first algorithm. For instance, the mobile device 1102 may generate randomized fillers using a pseudo-random number (PN) generation algorithm. Here, in an example where the first algorithm is configured to generate a randomized filler, the second algorithm is configured to generate a different randomized filler utilizing a different pseudo-random number generation algorithm.

The mobile device 1102 may then transmit the frame to the access node over the wireless communication link 1214. This process may be repeated for the next frame 1216, and potentially for all frames to be transmitted. Of course, in some aspects of the disclosure, some of the steps described above, such as the receiving of the message indicating whether the frames are to be encrypted and the sending of the acknowledgment message, may be omitted for some of the frames, and may be limited to utilization only when changing between the transmission of encrypted and unencrypted frames, or at any other suitable interval. Further, one or more frames may also be received by the mobile device 1102 from the access node, where such received frames may use fillers generated with the second algorithm if the received frames are encrypted or fillers generated with the first algorithm if the received frames are unencrypted.

Figure 13:
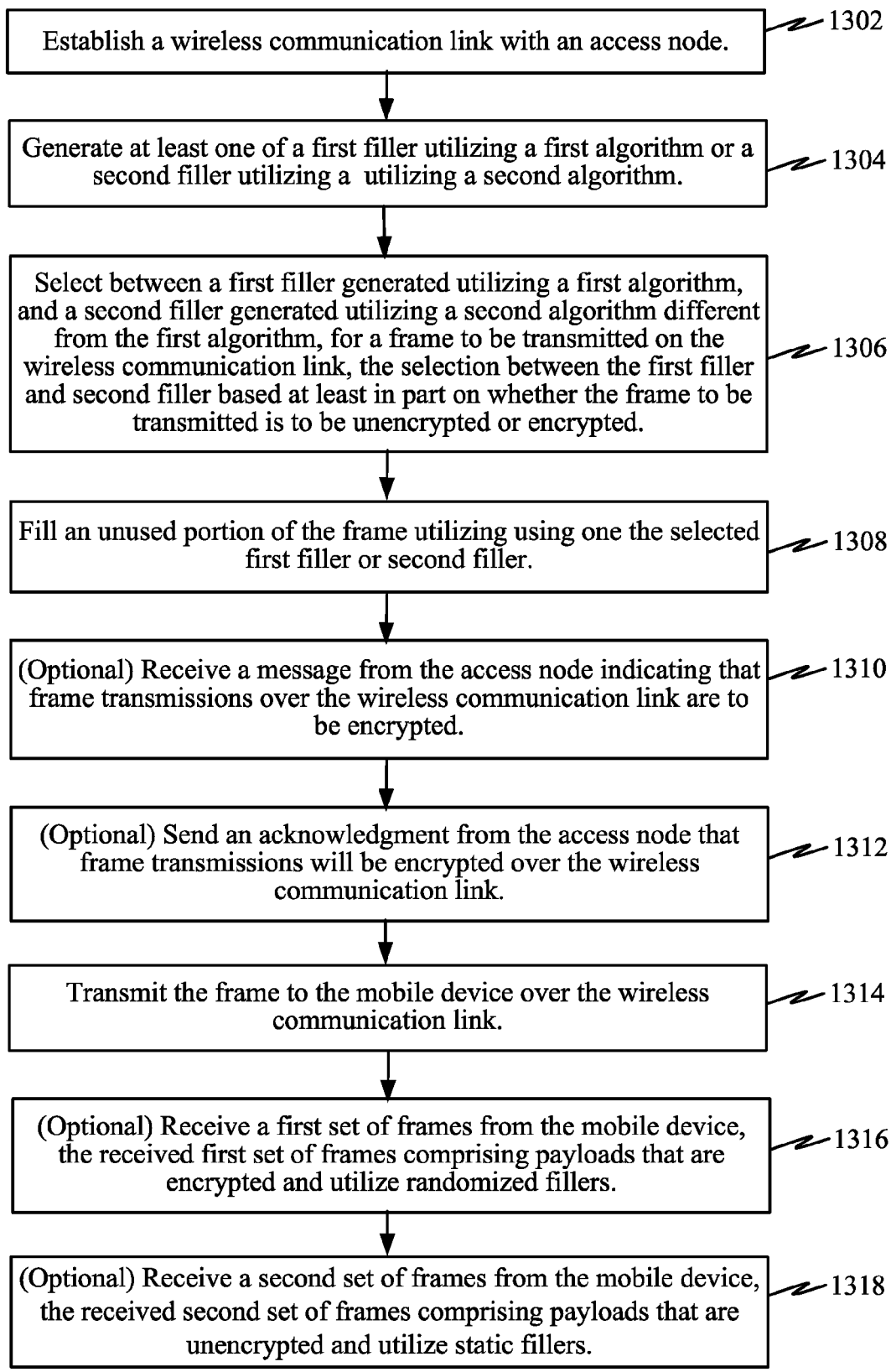
FIG. 13 is a flow diagram illustrating a method operational on an mobile device to utilize different types of fillers depending on the communication link.

FIG. 13 is a flow diagram illustrating a method operational on an mobile device 1102 to utilize different types of fillers depending on the communication link. The mobile device may establish a wireless communication link (e.g., dedicated mode connection or circuit-switched connection) with an access node 1302. The mobile device may generate at least one of the first filler (utilizing a first algorithm or the second filler (utilizing second algorithm) 1304. For instance, the first and/or second algorithm may be a random number generation algorithm. The mobile device may then select between the first filler generated utilizing a first algorithm, and the second filler generated utilizing a second algorithm different from the first algorithm, for a frame to be transmitted on the wireless communication link, the selection between the first filler and second filler based at least in part on whether the frame to be transmitted is to be unencrypted or encrypted 1306.

In one example, the mobile device may select the first filler when the frame to be transmitted is to be unencrypted (e.g., the first filler may be a static filler or the first filler may be a first randomized filler). In another example, the second filler may be selected when the frame to be transmitted is to be encrypted (e.g., the second filler may be a second randomized filler).

The mobile device may then fill an unused portion of the frame utilizing at least one of the selected first filler or second filler 1308. Optionally, the mobile device may receive a message from the access node indicating that frame transmissions over the wireless communication link are to be encrypted 1310. In response, the mobile device may send an acknowledgment to the access node that frame transmissions will be encrypted over the wireless communication link 1312. The frame may be transmitted to the access node over the wireless communication link 1314. The frame may be encrypted prior to transmission. For instance, the transmitted frame may be a frame for Link Access Procedures on the Dm channel (LAPDm) signaling.

According to one aspect, the mobile device may receive a first set of frames from the access node, the received first set of frames comprising payloads that are encrypted and utilize randomized fillers 1316. Similarly, the mobile device may receive a second set of frames from the access node, the received second set of frames comprising payloads that are unencrypted and utilize static fillers 1318.

Any of the circuit(s) or circuit sections disclosed herein may be implemented alone or in combination as part of an integrated circuit with one or more processors. The one or more of the circuits (e.g., the processing circuits 804 and/or 1104) may be implemented on microprocessors, microcontrollers, integrated circuits, digital signal processors (DSP), general purpose processors, field programmable gate arrays (FPGA), programmable logic devices (PLD), state machines, gated logic, discrete hardware circuits, and other suitable hardware configured to perform the various functions described throughout the present disclosure.

Also, it is noted that some of the aspects of the disclosure may be described as a process that is depicted in a flowchart, a call flow diagram, a structure diagram, or a block diagram. Although a flowchart and a call flow diagram may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Moreover, a storage medium may represent one or more devices for storing data, including read-only memory (ROM), random access memory (RAM), magnetic disk storage media, optical storage media, flash memory devices and/or other machine readable media for storing information. The terms "machine readable medium", "computer-readable media", and/or "processor-readable media" may include, but is not limited to, non-transitory media such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

One or more of the components, steps, and/or functions illustrated in the Figures may be rearranged and/or combined into a single component, step, or function or embodied in several components, steps, or functions. Additional elements, components, steps, and/or functions may also be added without departing from the invention. The apparatus, devices, and/or components illustrated in the Figures may be configured to perform one or more of the methods, features, or steps described in the Figures. The novel algorithms described herein may be efficiently implemented in software and/or embedded hardware.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features described herein can be implemented in different systems without departing from the invention. It should be noted that the foregoing embodiments are merely examples and are not to be construed as limiting. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational in an access node, comprising:
establishing a wireless communication link with a mobile device;
selecting between a first filler generated utilizing a first algorithm, and a second filler generated utilizing a second algorithm different from the first algorithm, for a frame to be transmitted on the wireless communication link, the selection between the first filler and second filler based at least in part on whether the frame to be transmitted is to be unencrypted or encrypted;
filling an unused portion of the frame utilizing at least one of the selected first filler or second filler; and
transmitting the frame to the mobile device over the wireless communication link.

2. The method of claim 1, further comprising:
selecting the first filler when the frame to be transmitted is to be unencrypted.

3. The method of claim 2, wherein the first filler is a static filler.

4. The method of claim 2, wherein the first filler is a first randomized filler.

5. The method of claim 1, further comprising:
selecting the second filler when the frame to be transmitted is to be encrypted.

6. The method of claim 5, wherein the second filler is a second randomized filler.

7. The method of claim 6, further comprising:
encrypting the frame prior to transmission.

8. The method of claim 1, further comprising:
generating at least one of the first filler or the second filler utilizing a random number generation algorithm.

9. The method of claim 1, wherein the transmitted frame comprises a frame for Link Access Procedures on the Dm channel (LAPDm) signaling.

10. The method of claim 1, further comprising:
sending a message to the mobile device indicating that frame transmissions over the wireless communication link are to be encrypted; and
receiving an acknowledgment from the mobile device that frame transmissions will be encrypted over the wireless communication link.

11. The method of claim 1, further comprising:
receiving a first set of frames from the mobile device, the received first set of frames comprising payloads that are encrypted and utilize randomized fillers; and
receiving a second set of frames from the mobile device, the received second set of frames comprising payloads that are unencrypted and utilize static fillers.

12. The method of claim 1, wherein the wireless communication link comprises a dedicated mode connection.

13. The method of claim 1, wherein the wireless communication link comprises a circuit-switched connection.

14. An access node, comprising:
a wireless communication interface adapted for wireless communication with at least one mobile device; and
a processing circuit coupled to the wireless communication interface, the processing circuit adapted to:
establish a wireless communication link with a mobile device;
select between a first filler generated utilizing a first algorithm, and a second filler generated utilizing a second algorithm different from the first algorithm, for a frame to be transmitted on the wireless communication link, the selection between the first filler and second filler based at least in part on whether the frames to be transmitted are unencrypted or encrypted;
fill an unused portion of the frame utilizing at least one of the selected first filler or second filler; and
transmit the frame to the mobile device over the wireless communication link.

15. An access node, comprising:
means for establishing a wireless communication link with a mobile device;
means for selecting between a first filler generated utilizing a first algorithm, and a second filler generated utilizing a second algorithm different from the first algorithm, for a frame to be transmitted on the wireless communication link, the selection between the first filler and second filler based at least in part on whether the frame to be transmitted is to be unencrypted or encrypted;
means for filling an unused portion of a frame utilizing at least one of the selected first filler or second filler; and
means for transmitting the frame to the mobile device over the wireless communication link.

16. A non-transitory processor-readable medium comprising one or more instructions operational in an access node, which when executed by a processing circuit, cause the processing circuit to:
establish a wireless communication link with a mobile device;
select between a first filler generated utilizing a first algorithm, and a second filler generated utilizing a second algorithm different from the first algorithm, for a frame to be transmitted on the wireless communication link, the selection between the first filler and second filler based at least in part on whether the frames to be transmitted are unencrypted or encrypted;
fill an unused portion of the frame utilizing at least one of the selected first filler or second filler; and
transmit the frame to the mobile device over the wireless communication link.

17. A method operational in a mobile device, comprising:
establishing a wireless communication link with an access node;
selecting between a first filler generated utilizing a first algorithm, and a second filler generated utilizing a second algorithm different from the first algorithm, for a frame to be transmitted on the wireless communication link, the selection between the first filler and second filler based at least in part on whether the frame to be transmitted is to be unencrypted or encrypted;
filling an unused portion of the frame utilizing at least one of the selected first filler or second filler; and
transmitting the frame to the access node over the wireless communication link.

18. The method of claim 17, further comprising:
selecting the first filler when the frame to be transmitted is to be unencrypted.

19. The method of claim 18, wherein the first filler is a static filler.

20. The method of claim 18, wherein the first filler is a first randomized filler.

21. The method of claim 17, further comprising:
selecting the second filler when the frame to be transmitted is to be encrypted.

22. The method of claim 21, wherein the second filler is a second randomized filler.

23. The method of claim 22, further comprising:
encrypting the frame prior to transmission.

24. The method of claim 17, wherein the transmitted frame is a frame for Link Access Procedures on the Dm channel (LAPDm) signaling.

25. The method of claim 17, further comprising:
generating at least one of the first filler or the second filler utilizing a random number generation algorithm.

26. The method of claim 17, further comprising:
receiving a message from the access node indicating that frame transmissions over the wireless communication link are to be encrypted; and
sending an acknowledgment to the access node that frame transmissions will be encrypted over the wireless communication link.

27. The method of claim 17, wherein the wireless communication link comprises a dedicated mode connection.

28. The method of claim 17, wherein the wireless communication link comprises a circuit-switched connection.

29. The method of claim 17, further comprising:
receiving a first set of frames from the access node, the received first set of frames comprising payloads that are encrypted and utilize randomized fillers; and
receiving a second set of frames from the access node, the received second set of frames comprising payloads that are unencrypted and utilize static fillers.

30. A mobile device, comprising:
a wireless communication interface adapted for wireless communication with at least one access node; and
a processing circuit coupled to the wireless communication interface, the processing circuit adapted to:
establish a wireless communication link with an access node;
select between a first filler generated utilizing a first algorithm, and a second filler generated utilizing a second algorithm different from the first algorithm, for a frame to be transmitted on the wireless communication link, the selection between the first filler and second filler based at least in part on whether the frame to be transmitted is unencrypted or encrypted;
fill an unused portion of the frame utilizing at least one of the selected first filler or second filler; and
transmit the frame to the access node over the wireless communication link.

31. A mobile device, comprising:
means for establishing a wireless communication link with an access node;
means for selecting between a first filler generated utilizing a first algorithm, and a second filler generated utilizing a second algorithm different from the first algorithm, for a frame to be transmitted on the wireless communication link, the selection between the first filler and second filler based at least in part on whether the frame to be transmitted is to be unencrypted or encrypted;
means for filling an unused portion of the frame utilizing at least one of the selected first filler or second filler; and
means for transmitting the frame to the access node over the wireless communication link.

32. A non-transitory processor-readable medium comprising one or more instructions operational on a mobile device, which when executed by a processing circuit, cause the processing circuit to:
establish a wireless communication link with an access node;
select between a first filler generated utilizing a first algorithm, or a second filler generated utilizing a second algorithm different from the first algorithm, for a frame to be transmitted on the wireless communication link, the selection between the first filler and second filler based at least in part on whether the frame to be transmitted is unencrypted or encrypted;
fill an unused portion of the frame utilizing at least one of the selected first or second filler; and
transmit the frame to the access node over the wireless communication link.

* * * * *